April 14, 1936.  H. A. S. HOWARTH  2,037,326
LEVELING WASHER AND THRUST BEARING CAGE
Filed May 19, 1934  4 Sheets-Sheet 1

April 14, 1936.  H. A. S. HOWARTH  2,037,326

LEVELING WASHER AND THRUST BEARING CAGE

Filed May 19, 1934  4 Sheets-Sheet 2

Inventor
Harry A. S. Howarth.
By Cameron, Kerkam + Sutton.
Attorneys

April 14, 1936.    H. A. S. HOWARTH    2,037,326
LEVELING WASHER AND THRUST BEARING CAGE
Filed May 19, 1934    4 Sheets—Sheet 4

Inventor
Harry A. S. Howarth.
By Cameron, Kerkam + Sutton.
Attorneys

Patented Apr. 14, 1936

2,037,326

UNITED STATES PATENT OFFICE 2,037,326

LEVELING WASHER AND THRUST BEARING CAGE

Harry A. S. Howarth, Philadelphia, Pa., assignor to Kingsbury Machine Works, Inc., Philadelphia, Pa., a corporation of Delaware Application May 19, 1934, Serial No. 726,554

28 Claims. (Cl. 308—160)

This invention relates to thrust bearings, and more particularly to thrust bearings for horizontal or inclined shafts of the type which employs a spherical leveling washer for the purpose of equalizing the thrust between a plurality of shoes in thrust sustaining relationship with a thrust transmitting member.

It is an object of this invention to provide an improved thrust bearing for horizontal or inclined shafts which is relatively compact in an axial direction with the center of sphericity of the leveling washer in or adjacent to the thrust collar, and which, at the same time, provides adequate freedom of movement between the spherically-surfaced pressure equalizing members.

Another object of this invention is to provide a bearing of the type characterized wherein the equalizing structure includes an inner washer provided with a spherical surface in contact with the spherical surface of a leveling washer and which is physically separated from that portion of the base structure which retains the bearing shoes in operative position, and wherein said inner washer may be assembled into and disassembled from the base structure in unitary relationship with one of the members thereof.

Another object of this invention is to provide a bearing of the type characterized which is so constructed that during assembly and disassembly of the base structure the parts thereof are so related as to prevent the inner washer from slipping or canting out of its proper relationship to the element or elements associated therewith.

Another object of this invention is to provide a bearing of the type characterized wherein the bearing may be assembled and disassembled by axial movement over the end of the shaft without the parts thereof slipping or canting out of their proper relationship.

Another object of this invention is to provide a bearing of the type characterized wherein the shaft with the bearing elements assembled thereon may be lifted out of the bearing housing without the bearing shoes falling out of their proper position.

Another object of this invention is to provide a bearing of the type characterized wherein the shoes are supported by a shoe cage which is split so that the shoes may be removed without moving the leveling washer or the inner washer.

Another object of this invention is to provide a bearing of the type characterized wherein the shoes are supported by a shoe cage that is rotatable with respect to the axis of the bearing so that the several shoes may be rotated into alignment with and removed radially through a suitable opening provided therefor.

Another object of this invention is to provide a bearing of the type characterized wherein the inner washer is so associated with the leveling washer or with a shoe cage that the two may be assembled and disassembled as a unit and the members of said unit are retained in their proper relationship during such assembly and disassembly.

Another object of this invention is to provide a bearing of the type characterized wherein the inner washer is united with the leveling washer or with a shoe cage by elastic means that permits the handling of said parts as a unit but which does not interfere with their proper relative movement to effect equalization of pressure on the bearing shoes.

Other objects of the invention will appear as the description proceeds.

The invention is capable of receiving a variety of mechanical expressions, several of which are illustrated more or less diagrammatically on the accompanying drawings, but it is to be expressly understood that the drawings are for purposes of illustration only, and are not to be construed as a definition of the limits of the invention, reference being had to the appended claims for that purpose.

Referring in detail to the drawings, wherein the same reference characters are employed to designate corresponding parts in the several figures.

It has heretofore been common practice to equalize the thrust on a plurality of thrust bearing shoes by supporting said shoes on a base ring having a spherical surface in engagement with a correspondingly shaped surface provided on a leveling washer. If the center of sphericity of said engaging surfaces lies between the axially spaced planes between which said base ring and leveling washer are disposed, the equalizing movement of said base ring on the spherical surface of the leveling washer may take place without radial displacement of either of said elements; but such a construction lacks compactness in the direction of the axis of the bearing because of the necessary axial depth of said base ring and leveling washer if the proper sphericity is maintained and the center of sphericity is at the same time within the confines of said elements. Therefore, it has been usual, in the interest of compactness, to so construct said elements that the center of sphericity is at or near the bearing surfaces, generally in the medial plane of the thrust collar. This construction, however, requires that the equalizing movement between the base ring and the leveling washer be accompanied not only by a sliding movement between the spherical surfaces but also by a radial displacement of either the leveling washer or the base ring. Hence if the base ring is so supported as to be centered by the bearing housing, clearance must be provided for radial displacement of the leveling washer, and if the leveling washer is centered in the bearing housing, provision must be made for radial displacement of the base ring.

It is frequently desirable that a bearing of this character be capable of assembly and disassembly with respect to the shaft by axial movement over the end of the shaft and that the shoes be mountable and demountable with respect to the thrust collar and base structure by movement radially into and out of their operative position without need for displacing the leveling washer. To facilitate assembly and disassembly of the bearing axially over the end of the shaft the parts should be so related as to avoid their slipping or falling out of their proper relationship during such assembly or disassembly. On the other hand, it is not uncommon practice, as in thrust bearings for turbines for example, to lift the turbine with its shaft out of the housings for the turbine and associated bearings, after the several housing caps have been removed, with the thrust bearing elements suspended on the shaft, and in such event it is important that, while the shoes be capable of being readily removed radially from their operative position for facility of access thereto, they be so supported in the bearing structure that they will not fall out of operative position when the bearing is thus raised in unitary relationship with the shaft.

To provide a thrust bearing of the type employing a spherical leveling washer and associated spherically faced base ring which possesses some or all of the foregoing advantageous characteristics, the present invention subdivides the base ring into what is herein called, for purposes of identification, an inner washer and a shoe cage, and the inner washer, which thus lies between the shoe cage and the leveling washer, is so associated with one or the other of these two elements that it may be assembled and disassembled in unitary relationship therewith while being retained against displacement from proper cooperative relationship therewith, said proper relationship being maintained either by reason of the manner of association of said elements or by reason of interposed elastic connecting means, but in either event the means for maintaining the proper relationship of the elements during assembly and disassembly being such as not to interfere with the proper relative radial displacement of the cooperating spherically-faced members so that the proper equalizing movement thereof is effected under the principles heretofore explained. At the same time the shoe cage, by reason of its construction and relationship is preferably such as to facilitate the ready removal of the shoes radially from their operative position without need for axial displacement of the leveling washer or inner washer while, at the same time, providing against the shoes falling out of their operative positions when the thrust bearing is raised as a unit with the shaft.

Figure 1:
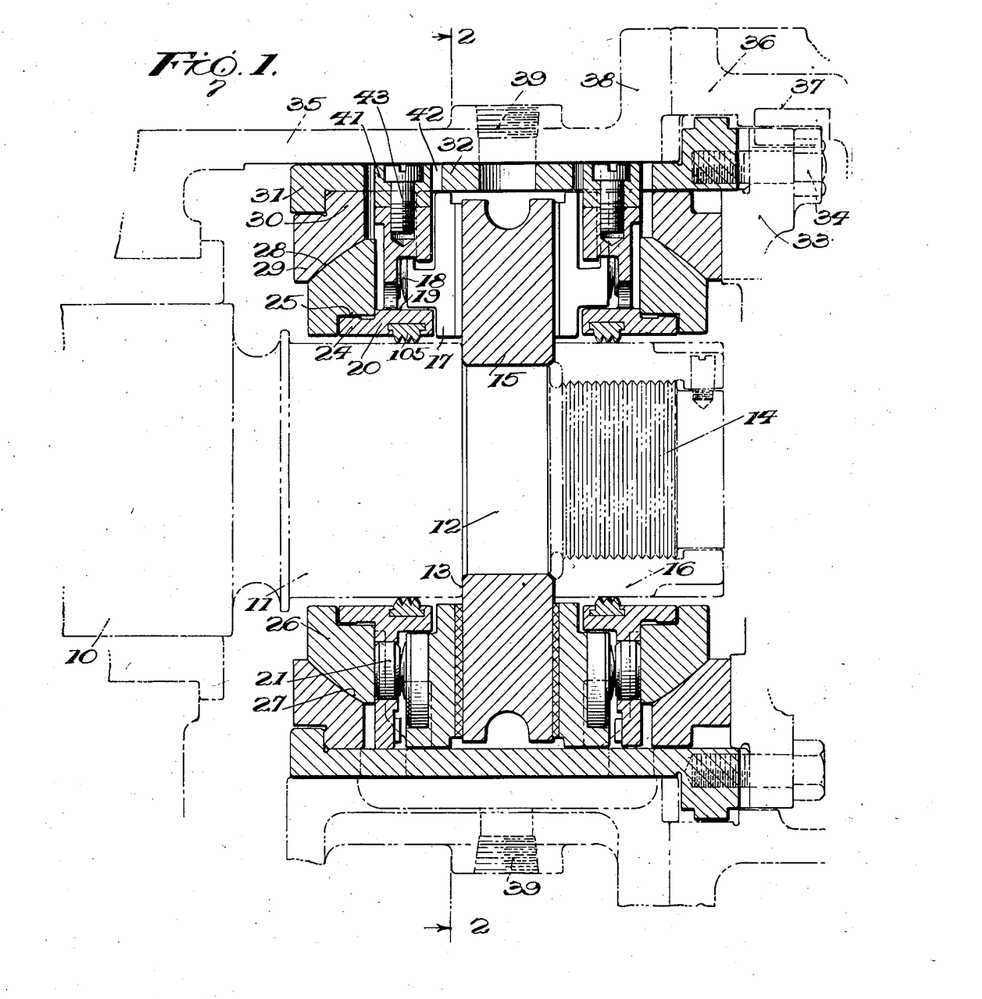
Fig. 1 is an axial section of a thrust bearing embodying the present invention.
Figure 2:
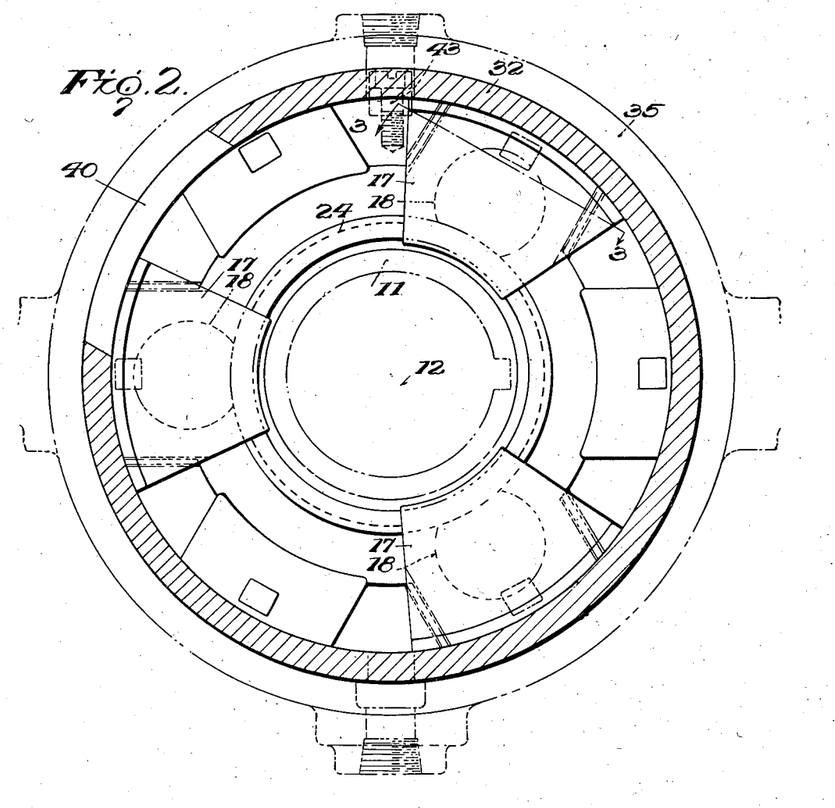
Fig. 2 is a transverse section of the embodiment of Fig. 1 on the line 2—2 thereof.
Figure 3:
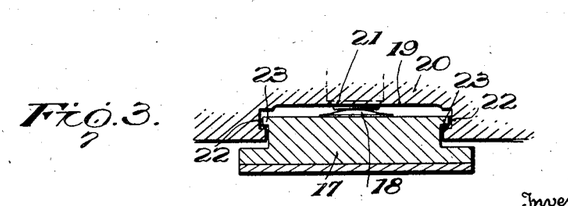
Fig. 3 is a fragmentary section on the line 3—3 of Fig. 2.

Referring first to the embodiment of Figs. 1, 2 and 3, the shaft 10, which may be any suitable horizontal or inclined shaft associated with any appropriate driving or driven mechanism, is shown as provided with portions of reduced diameter 11 and 12, forming a shoulder 13 therebetween, and a threaded extension 14. Mounted on the section 12 is a thrust collar 15 of any suitable size and construction, the same being shown as retained against the shoulder 13 by a nut 16 on the threaded extension 14. As illustrated, the thrust bearing is of the double acting type, and the parts to be described are therefore duplicated at each face of the thrust collar 15, but if the shaft is to sustain thrust in one direction only, the thrust bearing may be single acting with the thrust bearing elements to be described associated with only one face of the thrust collar.

As illustrated in this embodiment, a plurality of shoes 17 are associated with each face of the thrust collar, and they may be of any suitable number, size and construction. As shown, each shoe 17 is provided at its rear surface with a hardened spherical insert or projection 18 whereby said shoe is mounted for tilting movement both circumferentially and radially of the bearing in conformity with the well understood principles of the Kingsbury bearing. In this embodiment, said shoes are respectively mounted in recesses 19 provided in a shoe cage 20, said shoe cage at the bottom of each of said recesses 19, being shown as provided with a hardened block 21 which provides a surface for engagement with the spherical surface 18 at the rear of the shoe. As here shown, each block extends through an aperture in the shoe cage 20 to the rear face thereof where it provides a hardened surface for sliding engagement with the inner washer to be described. In order to retain each shoe in its recess 19 against displacement in other than a radially outward direction, the sides of each recess which are spaced circumferentially of the cage are undercut as shown at 22 in Fig. 3, and each shoe is provided at its corresponding sides with flanges 23 which fit loosely into the slots thus provided in the shoe cage, whereby each shoe is loosely retained in its recess against displacement therefrom except when moved radially outward with respect to the cage while, at the same time, each shoe has sufficient freedom in its recess to avoid interference with the desired tilting movement of the shoe. This construction also facilitates assembly and disassembly of the shoe cage with the shoes mounted therein, as a unit, by movement of the unit axially over the shaft when as here the shoe cage is made in one piece.

Shoe cage 20 is provided with an axial extension 24 which has a finished surface 25. Surrounding said extension 24 and in contact with the rear faces of the blocks 21 heretofore referred to is an inner washer 26 having a spherical surface 27 which is in engagement with the spherically faced surface 28 of a leveling washer 29 making a close fit with the bore of the bearing cage 32. The inner leveling washer 29 as here shown is provided with an outwardly extending flange 30 supported on an inwardly extending flange 31 of said bearing cage 32. The outer leveling washer is here shown as seated on an end plate 33 suitably attached to the cage 32 as by bolts 34. Cage 32 is centered in a bearing housing 35 which may be divisible on a horizontal plane and which as here shown is provided with a cover 36 suitably attached thereto. As here shown, a key 37 is provided between the cover 36 and the plate 33 to prevent rotation of the cage in the housing 35, but if preferred, the cage 32 may be provided with a flange which is bolted to the flange 38 on the housing. Suitable connections for circulating a lubricant through said housing are indicated at 39.

Bearing cage 32 is provided at a convenient location with a radial opening 40 (see Fig. 2) of sufficient size so that a bearing shoe 17 may be moved radially therethrough. Shoe cage 20 is normally retained against movement in bearing cage 32 by a key 41 which fits an aperture 42 in said cage 32 in a circumferential direction, said key being attached to the shoe cage in any suitable way, as by a screw 43. When screw 43 and key 41 are removed, the shoe cage 20 is free to rotate within the cage 32 and carry the shoes 17 therewith, the rear faces of the blocks 21 then sliding on the face of the inner washer 26. Thereby each shoe may be brought into radial alignment with the aperture 40 and moved radially through said aperture. When the parts are in their normal operative position, however, as shown in Fig. 2, said shoes are out of alignment with said aperture 40, and therefore the thrust bearing may be raised with the shaft 10, after the cap of the bearing housing 35 has been removed, without danger of the shoes 17 falling out of their proper positions.

As heretofore explained, the inner washer 26 surrounds the machined surface 25 on the extension 24 of the shoe cage 20. Extension 24 is of such length that the machined surface 25 underlies the center of gravity of the inner washer 26, and therefore said washer 26 may be mounted on said extension 24 and the two move as a unit into and out of operative position with the assurance that washer 26 will not cant or fall out of its proper relationship to shoe cage 20. As the washer 26 is of uniform cross section, it is immaterial whether or not it rotates with respect to the leveling washer 29 and the shoe cage 20, and therefore no means need be provided for holding said washer against rotation. At the same time the requisite freedom of movement is provided to enable equalization of the pressure on the bearing shoes without binding, as the washer 26 may slide radially with respect to the shoe cage 20 if suitable clearance is provided at 25, the surface of said washer sliding on the faces of the blocks 21. Therefore, the bearing structure may be readily assembled and disassembled by movement axially over the shaft with the assurance that the parts will not fall out of their proper relationship, while the means for maintaining such proper relationship is such as to avoid any improper restriction of the relative movement of the equalizing elements when the bearing is under load.

Figure 4:
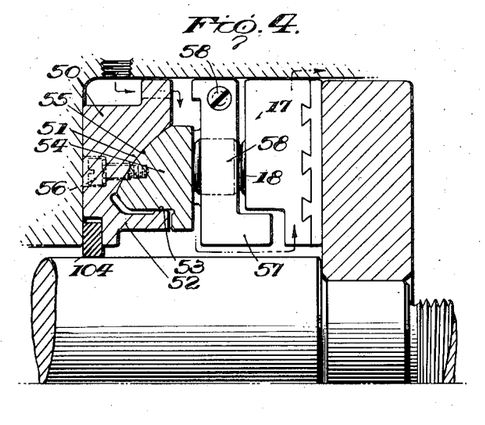
Figs. 4, 5, 6, 7, 8, 9, 10, 11 and 12 are fragmentary sections of a diagrammatic character to illustrate other embodiments of the present invention.

Referring next to the embodiment of Fig. 4, the construction here shown illustrates the inner washer and the leveling washer loosely mounted together for movement as a unit, this construction also illustrating the use of a shoe cage which is split to facilitate access to the bearing shoes without axial movement of the leveling washer or the inner washer. The constructions shown more or less diagrammatically in Figs. 4 to 12 inclusive do not include means for preventing radial displacement of the shoes from the shoe cage if the bearing is lifted vertically with the shaft, but it is to be expressly understood that the construction heretofore described in conjunction with the embodiment of Figs. 1 to 3, or any other suitable means, may be employed to prevent the shoes from falling out of position if desired, Figs. 4 to 12 inclusive being directed more particularly to the illustration diagrammatically of alternative constructions whereby the inner washer may be mounted in unitary relationship with either the leveling washer or the shoe cage for purposes of assembly and disassembly as heretofore explained. In the structures shown in Figs. 4, 8, 12, for example, the confining member for the parts shown in full, and whose inner wall alone is indicated, may be taken either as such a housing 35 as shown in Fig. 1, or such a cage 32 as shown in Fig. 1 with the radially inwardly directed wall on which the leveling washer is seated such a flange as shown at 31 in Fig. 1. The housing or cage may be made in halves for ready access to the parts, but owing to the construction employed, as now to be described in greater detail, ready access is also provided axially of the shaft because of the facility with which the parts may be moved into and out of operative position in unitary relationship.

In the embodiment of Fig. 4 the leveling washer 50 is provided with a spherical seat 51 and with an axial extension 52 which has a machined surface 53. Surrounding said extension 52 is an inner washer 54 having a spherical face 55 in engagement with the spherical seat 51. Extension 52 is of such length that the machined surface 53 underlies the center of gravity of the washer 54 and therefore said washer may be mounted in unitary relationship with leveling washer 50 with the assurance that it will not cant or fall out of its proper operative relationship thereto. If desired, a dowel 56 may also be loosely mounted in an aperture in the leveling washer with its inner end attached, as by threaded engagement, with the washer 54, so that said elements may be connected but without interfering with their proper relative movement because of the looseness of the dowel 56 in its aperture.

As here illustrated, the shoe cage 57 is made in halves suitably secured together by bolts or screws 58, so that when said bolts or screws are removed the halves of the shoe cage 57 may be removed radially, with the shoes retained thereon if preferred, and thereby ready access gained to said shoes. As here shown, the cage 57 has blocks 58 which provide hardened surfaces of contact both with the face of the inner washer 54 and the spherical surfaces 18 on the shoes 17.

In place of so constructing the inner washer and its associated leveling washer or shoe cage, as heretofore explained, so that they may be mounted together loosely and will retain their proper relationship during assembly and disassembly, said inner washer may be attached to the leveling washer or to the shoe cage by elastic means that will normally retain said parts in their proper cooperative relationship but without interfering with their relative movement, owing to the elasticity of the connecting means, to effect the proper equalization of pressure on the bearing shoes.

Figure 5:
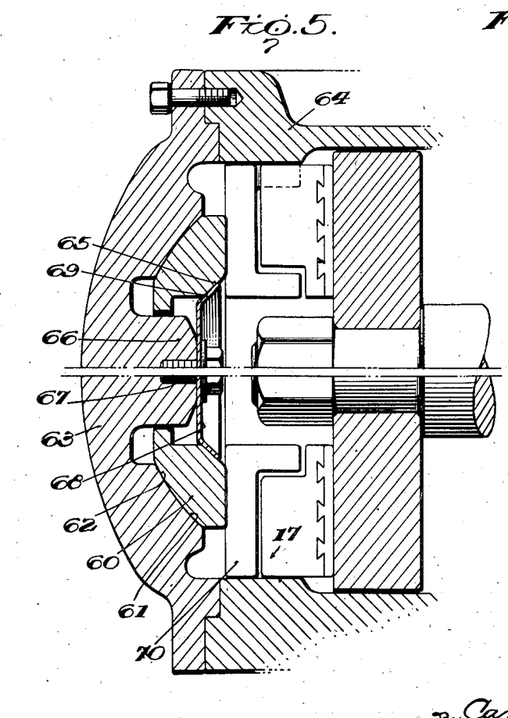

In the embodiment of Fig. 5, the inner washer 60, with its spherical surface 61, is mounted in engagement with the spherical seat 62 of a leveling washer 63 which, as here illustrated, also forms the cover for the bearing housing 64.

Washer 60 is shown as provided with an inner beveled surface 65 and suitably secured to a central boss 66 on the leveling washer 63, as by a screw 67, is a dished elastic member 68 of any suitable material, such as sheet metal, having a peripheral flange 69 in engagement with the beveled surface 65. Elastic member 68 thereby holds the washer 60 in unitary relationship with the leveling washer 63, and at the same time washer 60 is free to move to equalize the pressure on the bearing shoes when under load. The shoe cage 70, shown diagrammatically, may be of any suitable construction, and split as in Fig. 4 if preferred, and be associated with the shoes 17 in any suitable way.

Figure 6:
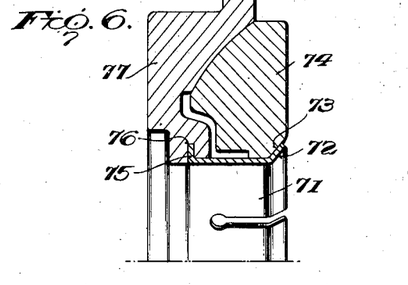
Figure 7:
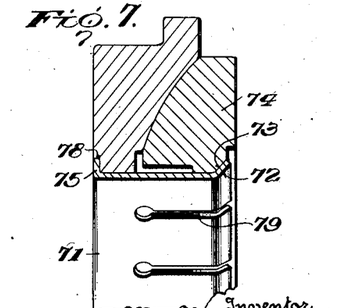

Figs. 6 and 7 illustrate alternative constructions for mounting the inner washer in unitary relationship with the leveling washer by means of an interposed elastic member. In each figure, the elastic means comprising a slotted sleeve 71 having its inner end flared is shown at 72 and in engagement with a beveled surface 73 on the inner washer 74. At its outer end sleeve 71 has a flange 75 engaged in a groove 76 formed in the leveling washer 77, as shown in Fig. 6, or said flange 75 may be engaged in a circumferential recess 78, as shown in Fig. 7. Sleeve 71 may be discontinuous in a circumferential direction so that it may be contracted and sprung into place, or in the form shown in Fig. 7 the flange 75 may be formed by rolling or spinning after the elastic sleeve 71 has been placed in operative relationship to the elements 74 and 77. Owing to the axially extending slots 79 formed in said sleeve 71 the latter has sufficient elasticity to provide for the proper relative movements between the inner washer and the leveling washer and at the same time said parts are held in unitary relationship for assembly and disassembly.

Figure 8:
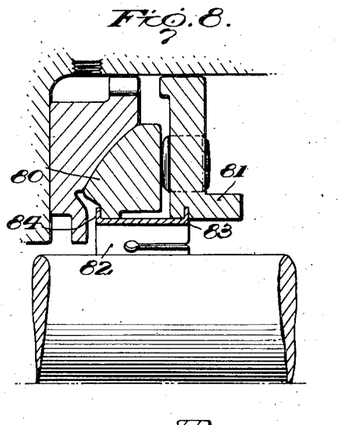

Fig. 8 illustrates the inner washer 80 mounted in unitary relationship with the shoe cage 81, which may be split as in Fig. 4 if desired, by means of a similar elastic ring 82 having a flange 83 for engagement in a slot in the shoe cage 81 and a flange 84 for engagement in a slot or recess in the washer 80.

In each of these embodiments it will be noted that the inner washer is uniform in cross section, and therefore it is unnecessary to key the same against rotation. In each of these embodiments the face of the inner washer may slide with respect to the shoe cage as well as at the spherical surfaces, and therefore the equalizing movement can be effected without binding of the parts.

Figure 9:
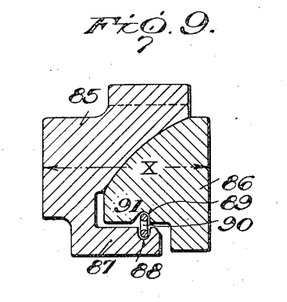
Figure 10:
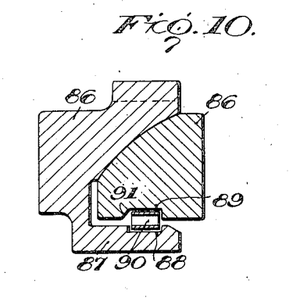
Figure 11:
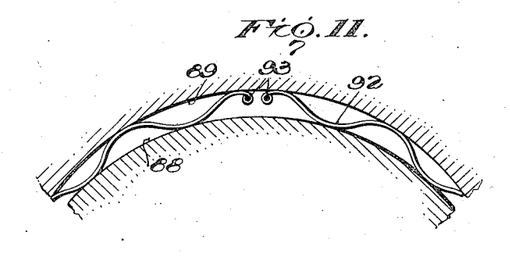

Figs. 9 and 10 illustrate further embodiments which may be employed in place of those heretofore described and wherein the inner washer is mounted in unitary relationship with the leveling washer by means of an interposed elastic member of corrugated formation, Fig. 11 being a transverse fragmentary view illustrating the corrugated members in elevation and applicable to either of the structures of Figs. 9 and 10. In these figures the elastic means is shown as interposed between the inner washer and the leveling washer, but as will be apparent similar means may be employed for elastically connecting the inner washer and the shoe cage if it is preferred to combine these into a unit. In each of these figures, the leveling washer is indicated at 85 and the inner washer at 86, these elements being of any suitable size, construction and material as heretofore explained. As in the embodiments of Fig. 4, the leveling washer is provided with an axially extending flange 87 which is suitably grooved at 88. The inner face of the inner washer 86 is provided with a radially aligned groove 89, and engaged in said grooves 88 and 89 is an elastic corrugated member, shown as a wire 90 in the embodiment of Fig. 9 and as a corrugated strip 91 in the embodiment of Fig. 10. Viewed axially, said corrugated member takes the form shown at 92 in Fig. 11, the ends of the corrugated member being unconnected as shown at 93 and permitting elastic contraction of said member radially of the flange 87. The corrugated member should be of sufficient stiffness to support the weight of the inner washer in order that it may be held in its proper position during assembly, and said member should have sufficient strength so that it will retain the inner washer against displacement from the leveling washer while connecting them into a unitary structure which may be moved into and out of operative position. Otherwise the elastic corrugated member may be of any suitable material, size, form and construction. In order that the leveling washer and inner washer may be separated without destroying the corrugated member the inner edge of the groove 89 is preferably beveled as shown at 91, so that upon application of a sufficient axial force to the inner washer 86 the elastic corrugated member may be depressed by the inclined edge of the slot 86 and thereby the inner washer 86 may be separated from the leveling washer 85 without destruction of said corrugated member.

Figure 12:
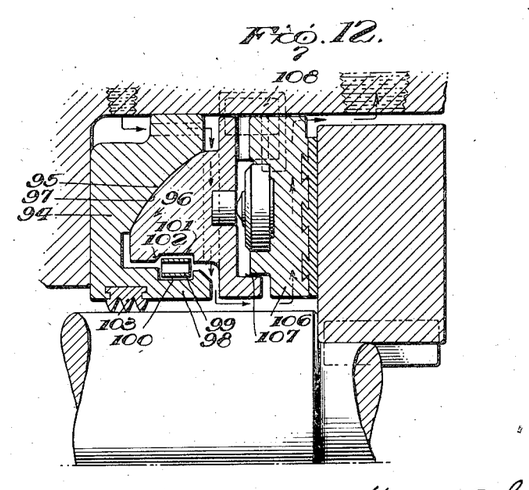

Fig. 12 shows an embodiment wherein certain features of the invention are employed in conjunction with a base ring which takes the place of the inner washer and shoe cage described in conjunction with other embodiments. In this construction the leveling washer 94 fits the bore of the surrounding cage or housing and has a spherical seat 95 in which is located the base ring 96 having a mating spherical surface 97. The leveling washer 94 has an axially extending flange 98 provided with a groove 99 in which is seated a corrugated member 100 that engages in a groove 101 in the base ring 96. As in the embodiment of Fig. 10, said groove is shown as having an inner beveled face 102. In place of the corrugated member 100, however, any other suitable elastic means such as heretofore described for elastically connecting the leveling washer and inner washer into a unit may be employed for connecting the leveling washer and base ring into a unit. In this construction a comb 103 is shown as interposed between the leveling washer and the shaft, this comb being employed in place of the seal ring 104 shown in Fig. 4. Said comb may also be mounted on the leveling washer in other embodiments, if preferred. The location of the comb 103 or seal ring 104 on the axially extending flange projecting inwardly from the leveling washer gives good control over leakage of oil along the shaft, but the oil retaining ring 104 of Fig. 4 possesses the advantage over such a comb shown at 103 in Fig. 12 or at 105 in Fig. 1 in that said ring may float with respect to the leveling washer.

In this embodiment the shoes 106 are locked to the base ring, as in recesses 107, and the base ring is shown as keyed at 108 to the housing of the bearing. Said shoes 106 may be retained on the base ring in any suitable way. When slots are provided at the periphery of the base ring for rotation into alignment with a radial opening in the bearing housing, the shoes may be removed radially as heretofore explained. In place of elastic means for retaining the base ring and leveling washer in unitary relationship, said parts may be associated into a unit by any other suitable means such as heretofore described.

The connection of the base ring with the leveling washer as a unit provides for the ready assembly and disassembly of said parts, either with or without the shoes already mounted in position on the base ring, and thereby the entire bearing structure composed of leveling washer, base ring and shoes may be moved into position in a horizontal bearing with assurance that the parts will not slip or fall out of their proper operative relationship during the movement of the unit into and out of the bearing housing—a feature possessed of marked utility in constructions wherein the only access to the interior of the bearing housing is axially of the shaft.

It will therefore be perceived that by the present invention a base ring has been subdivided into a shoe cage and an inner washer which may have relative movement and said inner washer may be mounted in unitary relationship with the leveling washer or with a shoe cage so that it may be moved into and out of position, and the bearing assembled and disassembled by movement axially over the shaft, without danger of the parts canting or falling out of their proper relationship. At the same time the bearing construction provides for easy access to the shoes, which may be removed radially for inspection without axial movement of the leveling washer or inner washer, and the shoes may be retained in their cage against falling therefrom if the bearing is raised vertically with the shaft. The requisite freedom of movement between the spherical surfaces of the equalizing structure is maintained, and at the same time the bearing structure is compact in an axial direction. The structure is simple and rugged, and it is composed of parts that are relatively easy to manufacture and standardize.

While the embodiments of the invention illustrated on the drawings have been described with considerable particularity, it is to be expressly understood that the invention is not restricted thereto, as the same is capable of receiving a variety of mechanical expressions, some of which will now suggest themselves to those skilled in the art, while changes may be made in the details of construction, arrangement and proportion of parts, and certain features may be used without other features, without departing from the spirit of this invention. Reference is therefore to be had to the appended claims for a definition of said invention.

What is claimed is:

1. In a thrust bearing for horizontal or inclined shafts, in combination with relatively rotatable bearing members including a plurality of bearing shoes, a leveling washer and an inner washer having contacting spherical surfaces, a shoe cage rotatably mounted on said inner washer and provided with means for loosely retaining said shoes in said cage, a bearing cage surrounding said shoe cage and provided with an aperture through which said shoes may be removed when moved into radial alignment with said aperture, and means for normally retaining said shoe cage against rotation with said shoes out of radial alignment with said aperture.

2. In a thrust bearing for horizontal or inclined shafts, in combination with relatively rotatable bearing members including a plurality of bearing shoes, a leveling washer and an inner washer having contacting spherical surfaces, a shoe cage rotatably mounted on said inner washer and provided with recesses in which said shoes are received, means for retaining said shoes loosely in said recesses but permitting radial removal of said shoes from said recesses, a bearing cage surrounding said shoe cage and providing an aperture through which said shoes may be removed when moved into radial alignment therewith, and means for attaching said shoe cage to said bearing cage with said shoes out of radial alignment with said aperture.

3. In a thrust bearing for horizontal or inclined shafts, in combination with relatively rotatable bearing members including a plurality of bearing shoes, a leveling washer and an inner washer having contacting spherical surfaces, and a shoe cage mounted on said inner washer and split for removal of the sections thereof radially of the bearing, said shoes being mounted on said cage sections and radially removable from the bearing.

4. In a thrust bearing for horizontal or inclined shafts, in combination with relatively rotatable bearing members including a plurality of bearing shoes, a leveling washer and an inner washer having contacting spherical surfaces, and a shoe cage on which said shoes are mounted and movable in a radial plane to permit radial removal of said shoes from the bearing.

5. In a thrust bearing for horizontal or inclined shafts, in combination with relatively rotatable thrust bearing members including a plurality of shoes, a member constituting a leveling washer, a member constituting a shoe cage on which said shoes are mounted, an inner washer having a spherical surface of engagement with said first named member and a surface on which said second named member is mounted, and means interposed between said inner washer and one of said first named members, whereby said washer may be moved into and out of operative position in unitary relationship with said member.

6. In a thrust bearing for horizontal or inclined shafts, in combination with relatively rotatable thrust bearing members including a plurality of shoes, a member constituting a leveling washer, a member constituting a shoe cage on which said shoes are mounted, an inner washer having a spherical surface of engagement with said first named member and a surface on which said second named member is mounted, and means interposed between said inner washer and one of said first named members whereby said washer may be moved into and out of operative position in unitary relationship with said member, said means including an axial extension underlying the center of gravity of said inner washer when said inner washer is assembled with said member.

7. In a thrust bearing for horizontal or inclined shafts, in combination with relatively rotatable thrust bearing members including a plurality of shoes, a member constituting a leveling washer, a member constituting a shoe cage on which said shoes are mounted, an inner washer having a sperical surface of engagement with said first named member and a surface on which said second named member is mounted, and means interposed between said inner washer and one of said first named members whereby said washer may be moved into and out of operative position in unitary relationship with said member, said means including an elastic connection between said inner washer and its associated member whereby said inner washer is normally maintained in its proper relationship to said member but said elastic connection may yield to permit relative movement of said inner washer and said member.

8. In a thrust bearing for horizontal or inclined shafts, in combination with relatively rotatable thrust bearing members including a plurality of bearing shoes, a leveling washer, an inner washer having a spherical surface of engagement with said leveling washer, a shoe cage mounted on said inner washer and forming a support for said shoes, and means on said leveling washer whereby said inner washer may be mounted in unitary relationship therewith and retained against improper displacement during assembly and disassembly of the bearing parts.

9. In a thrust bearing for horizontal or inclined shafts, in combination with relatively rotatable thrust bearing members including a plurality of bearing shoes, a leveling washer, an inner washer having a spherical surface of engagement with said leveling washer, a shoe cage mounted on said inner washer and forming a support for said shoes, and means on one of said washers whereby said other washer may be mounted in unitary relationship therewith and retained against improper displacement therebetween during assembly and disassembly of the bearing parts, said last named means including an extension on one of said washers which centers said other washer and underlies the center of gravity of said other washer when assembled therewith.

10. In a thrust bearing for horizontal or inclined shafts, in combination with relatively rotatable thrust bearing members including a plurality of bearing shoes, a leveling washer, an inner washer having a spherical surface of engagement with said leveling washer, a shoe cage mounted on said inner washer and forming a support for said shoes, and means on one of said washers whereby said other washer may be mounted in unitary relationship therewith and retained against improper displacement during assembly and disassembly of the bearing parts, said means including an elastic member mounted on one of said washers and engaging said other washer to center said other washer and retain the latter in unitary relationship with said first named washer but yieldable to permit relative movement therebetween.

11. In a thrust bearing for horizontal or inclined shafts, in combination with relatively rotatable bearing members including a plurality of bearing shoes, a member provided with a spherical surface and constituting a leveling washer, an inner washer provided with a spherical surface in engagement with said first named member, a second member mounted on said inner washer and providing a shoe cage on which said shoes are mounted, and means between said inner washer and one of said members whereby said inner washer may be mounted in unitary relationship therewith for movement into and out of operative position axially of the bearing, while substantially preventing angular displacement between said inner washer and its associated member.

12. In a thrust bearing for horizontal or inclined shafts, in combination with relatively rotatable bearing members including a plurality of bearing shoes, a member provided with a spherical surface and constituting a leveling washer, an inner washer provided with a spherical surface of engagement with said first named member, a second member mounted on said inner washer and providing a shoe cage on which said shoes are mounted, and means between said inner washer and one of said members whereby said inner washer may be mounted in unitary relationship therewith for movement into and out of operative position, said shoe cage being movable with respect to said inner washer to provide for access to the shoes mounted thereon.

13. In a thrust bearing for horizontal or inclined shafts, in combination with relatively rotatable bearing members including a plurality of bearing shoes, a member provided with a spherical surface and constituting a leveling washer, an inner washer provided with a spherical surface of engagement with said first named member, a second member mounted on said inner washer and providing a shoe cage on which said shoes are mounted, means between said inner washer and one of said members whereby said inner washer may be mounted in unitary relationship therewith for movement into and out of operative position, said shoe cage being rotatable with respect to said inner washer and provided with means for loosely retaining said shoes thereon, and means surrounding said shoe cage and provided with an aperture through which individual shoes may be removed when rotated into radial alignment therewith.

14. In a thrust bearing for horizontal or inclined shafts, in combination with relatively rotatable bearing members including a plurality of bearing shoes, a member provided with a spherical surface and constituting a leveling washer, an inner washer provided with a spherical surface of engagement with said first named member, a second member mounted on said inner washer and providing a shoe cage on which said shoes are mounted, means between said inner washer and one of said members whereby said inner washer may be mounted in unitary relationship therewith for movement into and out of operative position, said shoe cage being rotatable with respect to said inner washer and provided with recesses in which said shoes are loosely retained but from which they may be removed radially, means surrounding said cage and provided with a radial aperture through which individual shoes may be removed when said shoe cage is rotated to bring the shoes respectively into alignment with said aperture, and means for attaching said shoe cage to said last named means.

15. In a thrust bearing for horizontal or inclined shafts, in combination with relatively rotatable bearing members including a plurality of bearing shoes, a member provided with a spherical surface and constituting a leveling washer, an inner washer of uniform cross section and provided with a spherical surface of engagement with said first named member, a second member mounted on said inner washer and providing a shoe cage on which said shoes are mounted, and means between said inner washer and one of said members whereby said inner washer may be mounted in unitary relationship therewith for movement into and out of operative position.

16. In a thrust bearing for horizontal or inclined shafts, in combination with relatively rotatable bearing members including a plurality of bearing shoes, a member provided with a spherical surface and constituting a leveling washer, an inner washer provided with a spherical surface of engagement with said first named member, a second member mounted on said inner washer and providing a shoe cage on which said shoes are mounted, and means between said inner washer and one of said members whereby said inner washer may be mounted in unitary relationship therewith for movement into and out of operative position, said means including an annular extension at the center of one of said member and washer projecting into a central aperture in the other and underlying the center of gravity of said inner washer.

17. In a thrust bearing for horizontal or inclined shafts, in combination with relatively rotatable bearing members including a plurality of bearing shoes, a member provided with a spherical surface and constituting a leveling washer, an inner washer provided with a spherical surface of engagement with said first named member, a second member mounted on said inner washer and providing a shoe cage on which said shoes are mounted, and means between said inner washer and one of said members whereby said inner washer may be mounted in unitary relationship therewith for movement into and out of operative position, said means including an elastic sleeve attached to one of said member and washer and projecting into a central aperture in the other, said member and said shoe cage member being movable relatively to said inner washer to facilitate access to said shoes.

18. In a thrust bearing for horizontal or inclined shafts, in combination with relatively rotatable bearing members including a plurality of bearing shoes, a member provided with a spherical surface and constituting a leveling washer, an inner washer provided with a spherical surface of engagement with said first named member, an annular member mounted on the radial face of said inner washer and providing a shoe cage on which said shoes are mounted, and means whereby said inner washer may be mounted in unitary relationship therewith for movement into and out of operative position.

19. In a thrust bearing for horizontal or inclined shafts, in combination with relatively rotatable bearing members including a plurality of bearing shoes, a member provided with a spherical surface and constituting a leveling washer, an inner washer provided with a spherical surface of engagement with said first named member, an annular member mounted on the radial face of said inner washer and providing a shoe cage on which said shoes are mounted, and means whereby said inner washer may be mounted in unitary relationship therewith for movement into and out of operative position, said means including a central extension on one of said shoe cage and washer underlying the center of gravity of the other.

20. In a thrust bearing for horizontal or inclined shafts, in combination with relatively rotatable bearing members including a plurality of bearing shoes, a member provided with a spherical surface and constituting a leveling washer, an inner washer provided with a spherical surface of engagement with said first named member, an annular member rotatably mounted on said inner washer and providing a shoe cage on which said shoes are mounted, means whereby said inner washer may be mounted in unitary relationship therewith for movement into and out of operative position, means surrounding said shoe cage and provided with an aperture through which said shoes may be individually removed when said shoe cage is rotated to bring said shoes respectively into alignment with said aperture, and means for normally retaining said shoe cage against rotation with the shoes thereon out of radial alignment with said aperture.

21. In a thrust bearing for horizontal or inclined shafts, in combination with relatively rotatable thrust bearing members, a member constituting a leveling washer, a member constituting an equalizing mounting for the relatively stationary thrust bearing member, said members having spherical surfaces of engagement, and elastic means interposed between said members and connecting the same into a unit whereby they may be moved into and out of operative position in unitary relationship.

22. In a thrust bearing for horizontal or inclined shafts, in combination with relatively rotatable thrust bearing members, a member constituting a leveling washer, a member constituting an equalizing mounting for the relatively stationary thrust bearing member, said members having spherical surfaces of engagement, an axially extending flange on one of said members projecting into radial alignment with the other of said members, and elastic means interposed between said flange and radially aligned member whereby said members may be moved into and out of operative position in unitary relationship.

23. In a thrust bearing for horizontal or inclined shafts, in combination with relatively rotatable thrust bearing members having spherical surfaces of engagement, an axially extending flange on one of said members projecting into radial alignment with the other of said members and constituting a support for said last named member, said flange and radially aligned member cooperating to maintain said members in unitary relationship whereby they may be moved as a unit into and out of operative position.

24. In a thrust bearing for horizontal or inclined shafts, in combination with relatively rotatable thrust bearing members, a member constituting a leveling washer, a member constituting an equalizing mounting for the relatively stationary thrust bearing member, said members having spherical surfaces of engagement, an axially extending flange on one of said members extending into axial alignment with the other of said members, the contiguous surfaces of said flange and radially aligned member being provided with radially aligned circumferential grooves, and an elastic member disposed in said grooves and connecting said members into a unit whereby they may be moved into and out of operative position in unitary relationship.

25. In a thrust bearing for horizontal or inclined shafts, in combination with relatively rotatable thrust bearing members, a member constituting a leveling washer, a member constituting an equalizing mounting for the relatively stationary thrust bearing member, said members having spherical surfaces of engagement, an axially extending flange on one of said members extending into axial alignment with the other of said members, the contiguous surfaces of said flange and radially aligned member being provided with radially aligned circumferential grooves, and an elastic corrugated member disposed in said grooves and connecting said members into a unit whereby they may be moved into and out of operative position in unitary relationship, said corrugated member being elastically contractible and one of said grooves having an inclined surface for contracting said corrugated member and permitting the separation of said members.

26. In a thrust bearing for horizontal or inclined shafts, in combination with relatively rotatable thrust bearing members, a member constituting a leveling washer and making a close fit with a surrounding supporting member, said leveling washer having a central shaft opening, an oil retaining comb mounted on said leveling washer in said shaft opening and closely fitting the shaft therein, and a member constituting an equalizing mounting for the relatively stationary thrust bearing member and having a spherical surface of engagement with said leveling washer member.

27. In a thrust bearing for horizontal or inclined shafts, in combination with relatively rotatable thrust bearing members and a housing therefor, equalizing means therefor comprising a pair of members having spherical surfaces of engagement, and means between said members for maintaining them as a unit while they are being moved into and out of operative position relatively to said housing.

28. In a thrust bearing for horizontal or inclined shafts, in combination with relatively rotatable thrust bearing members, equalizing means therefor comprising a pair of members having spherical surfaces of engagement, and an axially extending flange on one of said members projecting into radial alignment with the other of said members and constituting a support for said last named member, said flange and radially aligned member cooperating to maintain said members in unitary relationship whereby they may be moved as a unit into and out of operative position.

HARRY A. S. HOWARTH.